United States Patent Office 3,375,877
Patented Apr. 2, 1968

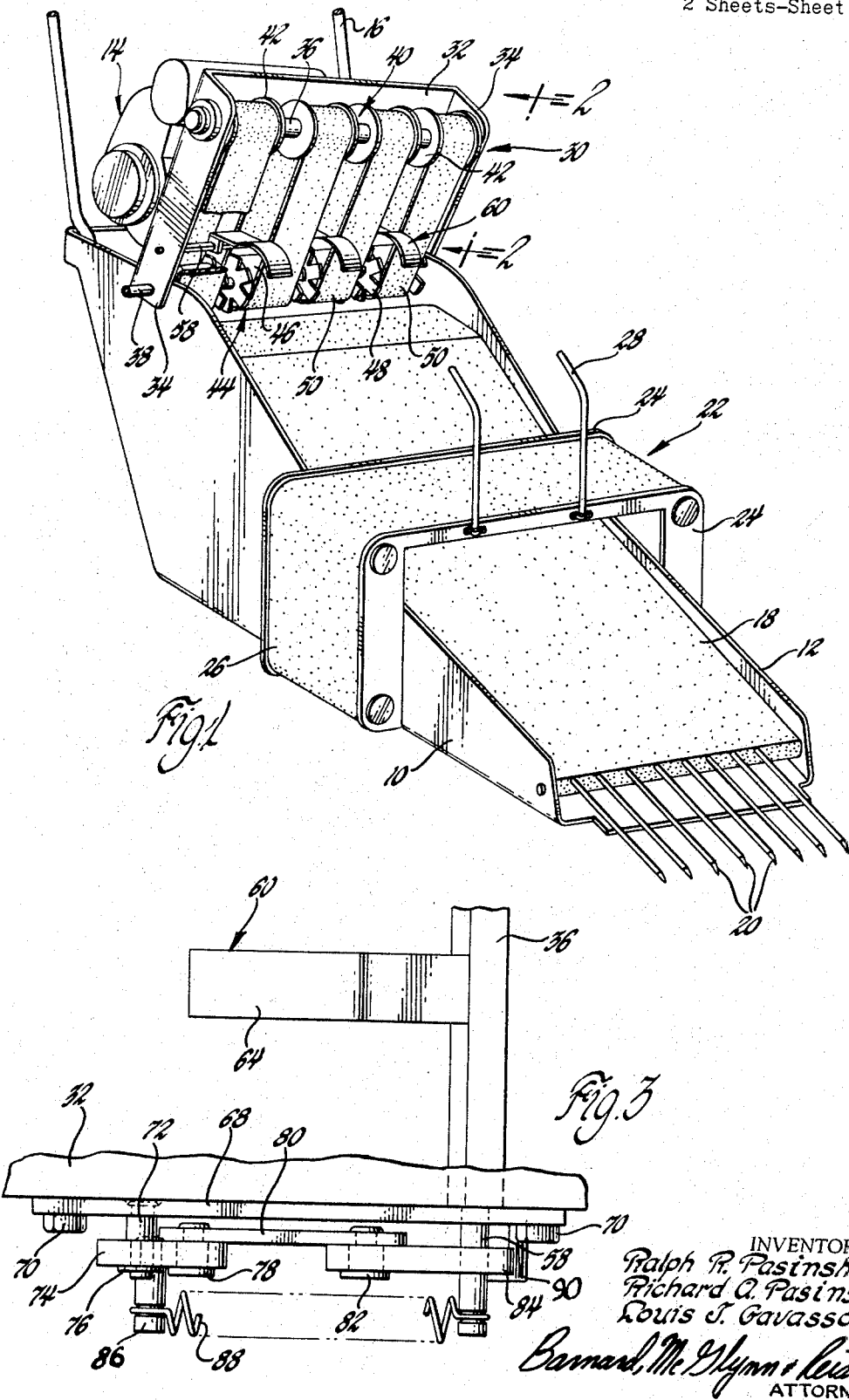

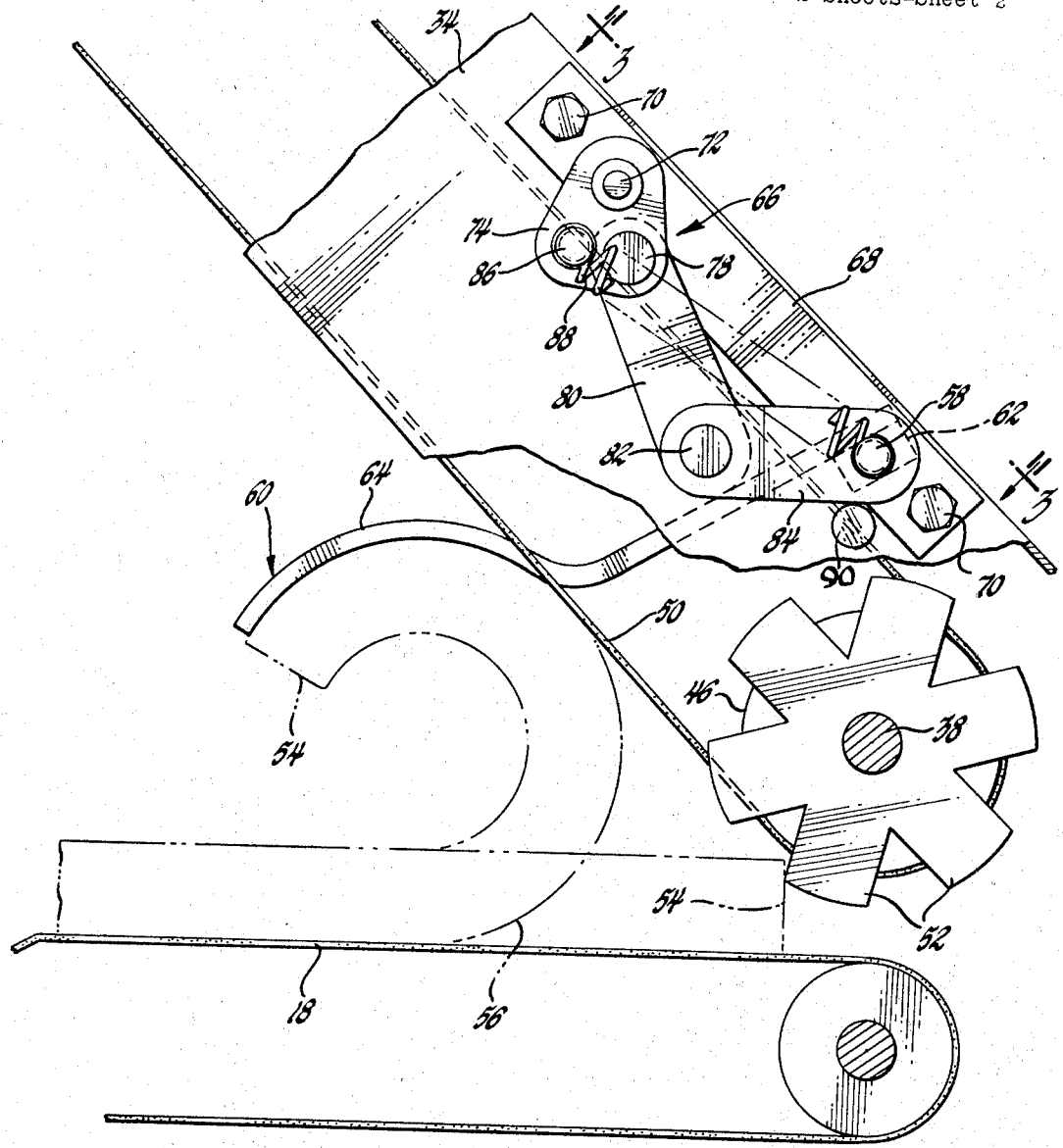

3,375,877
SOD ROLL FORMING MEANS
Ralph R. Pasinski, 17230 Sunderland, and Richard A. Pasinski, 16217 Stout, both of Detroit, Mich. 48219; and Louis J. Gavasso, Detroit, Mich.; said Gavasso, assignor to said Ralph R. Pasinski and said Richard A. Pasinski
Filed Oct. 19, 1965, Ser. No. 497,912
11 Claims. (Cl. 172—19)

ABSTRACT OF THE DISCLOSURE

Apparatus mounted on a sod roll forming machine for causing the leading edge of a strip of sod to be directed away from the roll forming mechanism and begin the formation of the roll. The apparatus includes serrated drum flanges for picking up the leading edge of the strip and directing it toward the roll forming conveyors. Fingers extending from the roll forming conveyors direct the leading edge away from such conveyors to begin roll formation.

---

This invention relates to sod roll forming means, and more particularly to sod roll forming means adapted to be mounted on a sod pick-up machine for picking up cut sod strips and rolling such strips into easily handleable rolls.

In the sod farming industry, it is the practice to prepare a large field of grass under controlled conditions to produce a desirable sod that may easily be lifted, transported to, and transplanted at some other location. This avoids the long and involved process of growing a lawn or the like by means of original seed planting. It is the usual practice to cut long strips of sod from the sod field by means of a suitable machine, cutting just below the root level of the grass and retaining a certain amount of dirt. The strips are then picked up and rolled into easily handleable rolls for transportation to the new location. Such cutting and pick-up operations may be accomplished in a single machine, or many times, two different machines are utilized. Normally, such machines are large cumbersome and complicated affairs that must be drawn by a tractor or a truck, and although many such machines are available, none have solved the problem of properly rolling the sod strip after it has been cut and lifted.

There are many parameters which must be taken into consideration in rolling the sod strips lifted from the ground. For example, the sod itself will vary, depending upon the type of grass that is grown and the amount of supporting dirt that must be provided in order to permit lifting, rolling and transplanting. The moisture content in the soil varies from field to field, and in accordance with weather conditions, also affecting the sod depth requirements and the ability of the sod to support itself in strip or roll form. The density of the grass in the sod strip also plays an important part in the proper sod formation, as does the degree of compacting of the sod, as might be caused by machines and other equipment rolling over the sod prior to the cutting and lifting operations. All of these variables have a bearing on the ease and efficiency with which a sod roll may be formed, and sod roll forming means must be provided that will accommodate such variables. A further parameter that must be taken into consideration is the type of machine utilized to raise the sod strip from the ground, and the manner in which the sod strip is conveyed to the sod roll forming means. For example, in one type of machine the sod roll is conveyed with the grassy side down, and in another machine the dirt side is in contact with the conveying structure. The driving means for moving the sod, whether it is a conveyor member of some type or simply the sod strip itself, will also affect the size and shape of the sod strip that is picked up.

It is here proposed to provide a sod roll forming means of relatively simple construction and one which is adaptable to existing machines of the type where the sod strip is conveyed with the dirt side down and a conveyor system carries the sod strip from the ground to the sod roll forming means. Such means includes, generally, a frame structure pivotally mounted on the machine and having conveyor means mounted in the frame structure and so arranged as to carry the sod strip generally upwardly. Arm means extend forwardly from the frame structure and adjacent the conveyor means, the arm means having arcuate portions which are contacted by the sod strip and direct it away from the conveyor members and into roll form. Means are provided at the lower ends of the conveyor means to engage the leading edge of the sod strip and lift the edge into engagement with the conveyor members to start the strip in its upward and then rolled direction.

Such a structure avoids most of the problems in presently existing sod roll forming means, whether such means form an integral part of the overall machine or whether such means are separate parts of an existing machine. The numerous variations in sod strips, due to moisture conditions, sod density, soil thickness and the like, are accommodated in that the arcuate portions of the arm means direct the leading edge of the sod strip into its all-important initial roll in a positive manner such that the variables affecting the formation of the roll are easily accommodated. The sod strip is positively lifted from the conveyor and directed to the arm means so that the initial roll formation is readily accomplished.

These and other advantages will become more apparent from the following description and drawings in which:

FIGURE 1 is a perspective view of a sod strip pickup machine with roll forming means embodying the invention mounted thereon;

FIGURE 2 is an elevational view of the sod roll forming means illustrated in FIGURE 1, taken substantially along the line 2—2 of FIGURE 1, and looking in the direction of the arrows;

FIGURE 3 is a view of a portion of the sod roll forming means illustrated in FIGURES 1 and 2, taken substantially along the line 3—3 of FIGURE 2, and looking in the direction of the arrows.

Referring more particularly to the drawings, FIGURE 1 best illustrates a sod roll pick-up machine which may be conveniently used in the sod farming industry, and which is more particularly described and illustrated in United States Patent No. 3,235,011, issued on Feb. 15, 1966, in the names of Richard A. Pasinski and Ralph R. Pasinski. Such machine is of the type that picks up the sod strip from the ground after the sod strip has been cut, and conveys the sod strip to sod roll forming means at the rear of the machine. The roll is formed and then ejected laterally from the machine to be picked up in another operation.

The machine illustrated in FIGURE 1 includes side frame members 10 and 12, suitably supported from the ground by rollers, wheels, skids or the like, not shown. The frame carries at its rearward end a prime mover, such as the engine indicated generally by the numeral 14. Suitable handlebars 16 permit control and steering of the machine, in the manner described in the aforementioned application. The engine 14 provides driving power for a conveyor belt 18, suitably mounted in the machine, the conveyor belt 18 running upwardly and rearwardly from the forward scoop fingers 20 that lift the sod strip from the ground and place the sod strip on the conveyor 18 for such upward and rearward movement. When the sod roll is formed, in a manner to be hereinafter more completely described, the sod roll moves forwardly of the machine to the transverse conveyor assembly, indicated generally by the numeral 22, which includes side members 24 and a conveyor belt 26. The belt 26 moves on rollers suitably mounted in the side members 24, transversely of the machine to eject the sod roll to one side or the other. Suitable stop means 28 may be mounted on the forward side member to stop the forward movement of the sod roll and to properly place the sod roll on the conveyor 26.

The sod roll forming assembly, indicated generally by the numeral 30, is mounted rearwardly of the machine on the frame members 10 and 12, and includes a frame structure 32 extending generally upwardly and forwardly relative to the machine for purposes described in the aforementioned application. The frame 32 is pivotally mounted in the side frame members 10 and 12 of the machine, in a manner to become hereinafter more apparent, to vary the size of the sod roll formed by the machine and to cause the sod roll to move forwardly toward the transverse conveyor 26.

Extending forwardly from the frame portion 32 are side flanges 34 in which are journalled upper and lower shafts, 36 and 38 respectively. The lower shaft 38 is also mounted in the side members 10 and 12 of the machine and may form suitable means for pivoting the entire sod roll forming assembly 30 relative to the machine frame.

Mounted on the upper shaft 36 are a plurality of drums 40, the drums including cylindrical portions and side flanges 42 and being secured to the shaft 36 in any suitable manner for rotation therewith. Similarly mounted on lower shaft 38 are spaced drums, indicated generally by the numeral 44, and including central cylindrical portions 46 and side flanges 48. Drums 44 are aligned with the drums 40 on the upper shaft 36 and are fixed to the shaft 38 for rotation therewith.

Entrained around the upper and lower drums, 40 and 44 respectively, are conveyor belts 50, the belts being received on the central cylindrical portions of the drums 40 and 44 and properly retained thereon by the side flanges 42 and 48. Suitable driving means (not shown) from the engine 14 to one of the shafts 36 or 38 provide the driving means for the conveyors 50, the movement being such that the forward reach of each of the conveyor belts 50 moves in an upward direction.

Lower drum flanges 48 are formed to provide fingers 52, best illustrated in FIGURE 2, to engage the leading edge 54 of the sod strip 56, illustrated by dashed and dotted lines in FIGURE 2. Fingers 52 lift the leading edge 54 into engagement with the upwardly moving conveyors 50. Such fingers or serrations 52 may be provided in any suitable manner, as by cutting out pie-shaped slices of the drum flanges 48, or by providing other radially outwardly extending means on the drum flanges 48.

Rotatably journalled in the side flanges 34 of the frame 32 is an intermediate shaft 58, on which are mounted a plurality of arms, indicated generally by the numeral 60. Arms 60 extend forwardly of the assembly 30 and between the conveyor belts 50, and are secured to the shaft 58 for rotation therewith in any suitable manner, as by side flanges 62 downwardly formed from the rearward ends of the arms 60 and secured to the shaft 58. The forward ends of arms 60 are arcuately formed, as at 64, to the proper curvature for beginning the sod roll and deflect the leading edge of the sod strip away from the conveyors 50, as illustrated in dashed and dotted lines in FIGURE 2. It will be apparent that as the sod roll grows in size the arm members 60 rotate upwardly about the axis of intermediate shaft 58 until the sod roll is of such size as to lose contact therewith.

In order to maintain a downward force on the arm members 60, a linkage arrangement, indicated generally by the numeral 66 and best shown in FIGURE 2, is provided. A mounting bracket 68 is secured to the side flange 34 in any suitable manner, as by bolts 70, and mounted in bracket 68 is a pivot pin 72. Pivot pin 72 receives a crank member 74, suitably held on the pivot pin 72 by a lock ring, or the like, 76. A second pivot 78 is mounted in crank 74 and supports one end of a link 80, link 80 being pivotally mounted by a pivot pin 82 on a second link 84, secured to the intermediate shaft 58. Also secured in the crank 74 is a post 86 that receives one end of a tension spring 88 extending between the post 86 and the end of the intermediate shaft 58. It will be apparent that as the arm 60 is raised, by means of the growth of the sod roll, the link 84 will be moved in a clockwise direction, as viewed in FIGURE 2, pushing the link 80 upwardly and to the left to rotate the crank 74 about the pivot 72. Such motion stretches the spring 88 between the shaft 58 and the post 86 to apply an increasing tensile force on the arm 60. Such force biases the arm 60 in a generally downward direction against the force of the growing sod roll. The lower limit of movement of arms 60 is provided by stop member 90 extending from bracket 68 and engaging link 84 in the limited position.

Should it be desirable to avoid continued biasing force of the arms 60 against the sod roll, the linkage 66 may be modified by including a suitable lost motion device, or the like, so that the spring tension increases temporarily as the sod roll grows but then loses its effectiveness so that the arm 60 will raise with the sod roll and without the biasing force. Any suitable device for providing such lost motion may easily be incorporated in the linkage system.

In the operation of the machine and the sod roll forming means, the machine is directed over the ground so that the scoop fingers 20 pick up the leading edge of the already cut sod strip and direct the sod strip to the conveyor 18. The sod strip is conveyed rearwardly with continued movement of the machine, as described in the aforementioned Patent Application, and the leading edge 54 is engaged and lifted by the fingers 52 on the lower drum members. Such lifting of the leading edge causes the leading edge to contact the upwardly moving conveyor 50 where it is carried upwardly and forwardly until it contacts the arcuate portion 64 of the arm members 60. Such arcuate portions deflect the leading edge 54 forwardly and downwardly to begin the formation of the roll. As described in the aforementioned application, the angle at which the sod roll forming assembly 30 is disposed relative to the machine causes the roll, as it grows in size, to move forwardly toward the transverse conveyor 22. As the roll grows in size and moves forwardly in such manner, it will roll of its own weight to the transverse conveyor 22 where it is stopped by the stop means 28 and ejected from the machine.

Thus a sod roll forming means is provided which easily and efficiently begins the sod roll formation, regardless of the numerous variables affecting the condition of the sod. The device is simple to manufacture and assemble, and may be adapted to existing machines with ease and facility. The device is positive in its operation and has relatively few moving parts requiring adjustment, repair and/or replacement.

Numerous modifications and changes will occur to those having skill in the art after having had reference to the foregoing description and drawings. However, it is not intended to limit the scope of the invention by the foregoing, but by the appended claims.

The embodiments of the invention in which an exclusive property or privilege is claimed are defined as follows:

1. In a sod rolling machine adapted to lift a strip of sod from the ground and convey said strip to sod strip rolling means, said sod strip rolling means comprising:
   conveyor means moving in a direction to convey the leading edge of said sod strip upwardly and including upper and lower drum members;
   means on said lower drum member for engaging and lifting the leading edge of said sod strip into engagement with said conveyor means;

an arm extending forwardly of said conveyor means, said arm receiving the leading edge of said sod strip and directing the leading edge of said sod strip away from said conveyor means and into a roll;

and spring biasing means operatively connected to said arm for biasing said arm in a sod roll engaging direction.

2. In a sod roll forming machine adapted to lift a sod strip from the ground, sod roll forming means comprising:

a frame mounted on said machine and having forwardly extending flanges;

upper and lower shaft members journalled in said flanges and extending thereacross;

a plurality of spaced drum members on said upper shaft;

a plurality of spaced drum members on said lower shaft and aligned with said drum members on said upper shaft, said drum members on said lower shaft having means thereon for engaging and lifting the leading edge on said sod strip;

and a plurality of transversely spaced conveyor members entrained around corresponding drum members on said upper and lower shafts, the forward reaches of said conveyor members being movable in an upward direction;

said means on said drum members on said lower shaft and said conveyor member raising the leading edge of said sod strip and forming said sod strip into a roll.

3. In a sod roll forming machine adapted to lift a sod strip from the ground, sod roll forming means comprising:

a frame pivotally mounted rearwardly of said machine and having forwardly extending flanges;

upper and lower shaft members journalled in said flanges and extending thereacross;

a plurality of spaced drum members on said upper shaft;

a plurality of spaced drum members on said lower shaft aligned with said drum members on said upper shaft, said drum members on said lower shaft having serrated radial flanges;

and a plurality of transversely spaced conveyor members entrained around corresponding drum members on said upper and lower shafts, the forward reaches of said conveyor members being movable in an upward direction;

said serrated drum flanges and said conveyor members raising the leading edge of said sod strip and forming said sod strip into a roll.

4. In a sod roll forming machine adapted to lift a sod strip from the ground, sod roll forming means comprising:

a frame pivotally mounted rearwardly of said machine and having forwardly extending flanges;

upper and lower shaft members journalled in said flanges and extending thereacross;

a plurality of spaced drum members on said upper and lower shafts, said upper and lower drum members being in aligned relation;

a plurality of transversely spaced conveyor members entrained around said drum members on said upper and lower shafts, the forward reaches of said conveyor members being movable in an upward direction;

an intermediate shaft extending between said flanges on said frame;

a plurality of arm members secured to said intermediate shaft and extending forwardly therefrom and between said conveyor members;

and spring and linkage means between said frame and said intermediate shaft to bias said intermediate shaft in one position and permit rotational movement of said intermediate shaft and upward movement of said arm members against spring pressure;

said conveyor members raising the leading edge of said sod strip and said arcuate portions of said arms directing said leading edge in a forward and downward direction to form said sod strip into a roll.

5. In a sod roll forming machine adapted to lift a sod strip from the ground, sod roll forming means comprising:

a frame mounted on said machine and having forwardly extending flanges;

upper and lower shaft members journalled in said flanges and extending thereacross;

a plurality of spaced drum members on said upper and lower shaft members, said drum members being in vertically aligned relation;

a plurality of transversely spaced conveyor members entrained around corresponding drum members on said upper and lower shafts, the forward reaches of said conveyor members being movable in an upward direction;

an intermediate shaft extending between said flanges on said frame;

a plurality of arm members secured to said intermediate shaft and extending forwardly therefrom and between said conveyor members;

and spring means between said frame and said intermediate shaft to bias said intermediate shaft and said arms in one position;

said conveyor members raising the leading edge of said sod strip and said arms directing said leading edge in a forward and downward direction to form said sod strip into a roll.

6. In a sod roll forming machine adapted to lift a sod strip from the ground, sod roll forming means comprising:

a frame mounted on said machine and having forwardly extending flanges;

upper and lower shaft members journalled in said flanges and extending thereacross;

a drum member on said upper shaft;

a drum member on said lower shaft and aligned with said drum member on said upper shaft, said drum members on said lower shaft having means thereon for engaging and lifting the leading edge of said sod strip;

a conveyor member entrained around said drum members on said upper and lower shafts, the forward reach of said conveyor member being movable in an upward direction;

an intermediate shaft extending between said flanges on said frame;

an arm member secured to said intermediate shaft and extending forwardly therefrom and forwardly of said conveyor member, said arm member having an arcuate portion curving forwardly and downwardly forwardly of said conveyor member;

and spring and linkage means between said frame and said intermediate shaft for biasing said arm member downwardly;

said means on said lower drum flange and said conveyor member raising the leading edge of said sod strip and said arcuate portion of said arm directing said leading edge in a downward and forward direction to form sod strip into a roll.

7. In a sod roll forming machine adapted to lift a sod strip from the ground, sod roll forming means comprising:

a frame mounted on said machine and having forwardly extending flanges;

upper and lower shaft members journalled in said flanges and extending thereacross;

a drum member on said upper shaft;

a drum member on said lower shaft and aligned with said drum member on said upper shaft, said drum member on said lower shaft having serrated radial flanges;

a conveyor member entrained around said drum members on said upper and lower shafts, the forward reach of said conveyor member being movable in an upward direction;

an intermediate shaft journalled in said flanges on said frame and extending therebetween;

an arm member secured to said intermediate shaft and extending forwardly therefrom and forwardly of said conveyor member, said arm member having an arcuate portion curving forwardly and downwardly forwardly of said conveyor member;

and spring means between said frame and said intermediate shaft and said arm in one position;

said serrated drum flange and said conveyor member raising the leading edge of said sod strip and said arm directing said leading edge in a forward and downward direction to form said sod strip into a roll.

8. In a sod roll forming machine adapted to lift a sod strip from the ground, sod roll forming means comprising:

a frame mounted on said machine and having forwardly extending flanges;

upper and lower shaft members journalled in said flanges and extending thereacross;

a plurality of spaced upper drum members on said upper shaft;

a plurality of spaced lower drum members on said lower shaft and aligned with said upper drum members on said upper shaft, said lower drum members having means thereon for engaging and lifting the leading edge of said sod strip;

a plurality of transversely spaced conveyor members entrained around corresponding drum members on said upper and lower shafts, the forward reaches of said conveyor members being movable in an upward direction;

an intermediate shaft journalled in said flanges on said frame and extending therebetween;

a plurality of arm members secured to said intermediate shaft and extending forwardly therefrom and between said conveyor members, said arm members having arcuate portions curving forwardly and downwardly forwardly of said conveyor members;

and spring and linkage means between said frame and said intermediate shaft for biasing said arm members in a downward direction;

said means on said lower drum members and said conveyor members raising the leading edge of said sod strip and said arcuate portions of said arms directing said leading edge in a forward and downward direction to form said sod strip into a roll.

9. In a sod roll forming machine adapted to lift a sod strip from the ground, sod roll forming means comprising:

a frame pivotally mounted rearwardly of said machine and having forwardly extending flanges;

upper and lower shaft members journalled in said flanges and extending thereacross;

a plurality of spaced drum members on said upper shaft;

a plurality of spaced drum members on said lower shaft and aligned with said drum members on said upper shaft, said drum members on said lower shaft having serrated radial flanges;

a plurality of transversely spaced conveyor members entrained around corresponding drum members on said upper and lower shafts, the forward reaches of said conveyor members being movable in an upward direction;

an intermediate shaft journalled in said flanges on said frame and extending therebetween;

a plurality of arm members secured to said intermediate shaft and extending forwardly therefrom and between said conveyor members, said arm members having arcuate portions curving forwardly and downwardly forwardly of said conveyor members;

and spring and linkage means between said frame and said intermediate shaft to bias said intermediate shaft in one position and permit rotational movement of said intermediate shaft and upward movement of said arm members against spring pressure;

said serrated drum flanges and said conveyor members raising the leading edge of said sod strip and said arcuate portions of said arms directing said leading edge in a forward and downward direction to form said sod strip into a roll.

10. In a sod roll forming machine, sod roll forming means comprising, in combination:

a plurality of planar rotatable members (48) operatively mounted on said sod roll forming machine;

conveyor means (30–46, 50) disposed adjacent each of said planar rotatable members and arranged at a predetermined angle relative to the ground;

each of said planar rotatable members (48) being provided with sod engaging means (52) extending radially outwardly from the center of its associated planar rotatable members (48) and lying completely within the plane of said associated planar rotatable member (48);

said sod engaging means (52) being adapted to contact the leading edge (54) of a sod strip (56) and to move the leading portion of said sod strip (56) into contact with said conveyor means (30–46, 50) to form the initial convolution of the sod roll to be formed; and said predetermined angle of said conveyor means (30–46, 50) remaining fixed throughout the entire forming and rolling of said sod roll.

11. In a sod roll forming machine, sod roll forming means comprising, in combination:

a motor-driven shaft (38) rotatably mounted on said sod roll forming machine;

a plurality of planar rotary discs (48) rigidly secured to said motor-driven shaft (38) and adapted to rotate in unison with said motor-driven shaft (38);

each of said planar rotary discs (48) being provided with sod engaging means (52) extending radially outwardly from the centrally-disposed motor-driven shaft (38) and lying completely within the plane of their associated planar rotary disc (48);

conveyor means (30–46, 50) disposed adjacent each of said planar rotary discs (48) and at a predetermined angle relative to the ground and at a predetermined height above the ground;

said sod roll engaging means (52) being adapted to contact the leading edge (54) of said sod strip (56) and to move the leading portion of said sod strip (56) into engagement with said conveyor means (30–46, 50) to form the initial convolution of the sod roll to be formed; and said predetermined angle and said predetermined height of said conveyor means (30–46, 50) remaining substantially constant throughout the entire forming and rolling of said sod roll.

References Cited

UNITED STATES PATENTS

| | | | |
|---|---|---|---|
| 2,617,347 | 11/1952 | Provost | 172—20 |
| 2,756,661 | 7/1956 | Frisbie et al. | 172—20 |
| 2,778,292 | 1/1957 | Kavan | 172—20 |
| 3,164,211 | 1/1965 | Scott | 172—19 |

FOREIGN PATENTS 1,169,452  9/1958  France.

ABRAHAM G. STONE, *Primary Examiner.*

WILLIAM A. SMITH, III, *Examiner.*

J. R. OAKS, *Assistant Examiner.*